(12) United States Patent
Daigle et al.

(10) Patent No.: US 10,897,873 B1
(45) Date of Patent: Jan. 26, 2021

(54) HAY SHAKER AND LIVESTOCK FEEDER

(71) Applicants: Wayne Daigle, Milton (CA); Veronica Myles, Milton (CA)

(72) Inventors: Wayne Daigle, Milton (CA); Veronica Myles, Milton (CA)

( * ) Notice: Subject to any disclaimer, the term of this patent is extended or adjusted under 35 U.S.C. 154(b) by 207 days.

(21) Appl. No.: 16/242,112

(22) Filed: Jan. 8, 2019

(51) Int. Cl.
*A01K 1/10* (2006.01)

(52) U.S. Cl.
CPC ........................... *A01K 1/10* (2013.01)

(58) Field of Classification Search
CPC .......... A01K 5/00; A01K 5/001; A01K 5/002; A01K 1/10
See application file for complete search history.

(56) References Cited

U.S. PATENT DOCUMENTS

| | | | | |
|---|---|---|---|---|
| 2,660,949 A * | 12/1953 | Russell | ................ | A01F 15/08 100/187 |
| 3,640,386 A * | 2/1972 | Frangos | ................ | B07B 1/30 209/337 |
| 4,656,969 A * | 4/1987 | Rapp | ................ | A01K 5/0225 119/51.11 |
| 4,784,085 A * | 11/1988 | Schoessow | ............ | A01K 1/10 119/58 |
| 5,205,241 A | 4/1993 | Halpin | | |
| 5,509,377 A * | 4/1996 | Franklin | ................ | A01K 1/10 119/60 |
| 5,520,143 A | 5/1996 | Duin | | |
| 5,899,169 A * | 5/1999 | Jenson | ................ | A01K 5/0291 119/51.11 |
| 6,263,833 B1 * | 7/2001 | Runyan | ................ | A01K 5/00 119/51.11 |
| D505,522 S | 5/2005 | Jurk | | |
| 7,418,924 B2 * | 9/2008 | Klene | ................ | A01K 5/01 119/60 |
| 9,102,258 B2 * | 8/2015 | Nisbet | ................ | B60P 3/04 |
| 2005/0274654 A1 * | 12/2005 | Sukovaty | ............. | B07B 1/42 209/365.2 |
| 2007/0137585 A1 * | 6/2007 | Rausch | ............ | A01K 5/0216 119/53 |
| 2009/0293811 A1 * | 12/2009 | Wersal | ................ | A01K 1/10 119/57.92 |
| 2010/0263597 A1 * | 10/2010 | Kerns | ................ | A01K 1/10 119/60 |
| 2010/0287826 A1 * | 11/2010 | Hoffman | ............. | C10L 5/363 44/605 |
| 2015/0320013 A1 * | 11/2015 | Camilletti | ............. | A01K 5/01 119/57.1 |

* cited by examiner

*Primary Examiner* — Monica L Barlow
*Assistant Examiner* — Aaron M Rodziwicz
(74) *Attorney, Agent, or Firm* — Kyle A. Fletcher, Esq.

(57) ABSTRACT

The hay shaker and livestock feeder is configured for use with livestock. The hay shaker and livestock feeder is configured for use with livestock feed. The hay shaker and livestock feeder removes detritus, such as dust, from the livestock feed. The hay shaker and livestock feeder comprises a separating chamber, a plurality of stanchions, a vacuum system, and one or more vibration motors. The plurality of stanchions elevates the separating chamber above the ground. The vacuum system and the one or more vibration motors attach to the separating chamber. The separating chamber contains the livestock feed. The vacuum system and the one or more vibration motors combine to remove the detritus from the livestock feed contained within the separating chamber.

19 Claims, 6 Drawing Sheets

HAY SHAKER AND LIVESTOCK FEEDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and the processing of harvested produce, more specifically, a detail of apparatus for processing hay in a feeding device. (A0F29/10)

SUMMARY OF INVENTION

The hay shaker and livestock feeder is configured for use with livestock. The hay shaker and livestock feeder is configured for use with livestock feed. The hay shaker and livestock feeder removes detritus, such as dust, from the livestock feed. The hay shaker and livestock feeder comprises a separating chamber, a plurality of stanchions, a vacuum system, and one or more vibration motors. The plurality of stanchions elevates the separating chamber above the ground. The vacuum system and the one or more vibration motors attach to the separating chamber. The separating chamber contains the livestock feed. The vacuum system and the one or more vibration motors combine to remove the detritus from the livestock feed contained within the separating chamber.

These together with additional objects, features and advantages of the hay shaker and livestock feeder will be readily apparent to those of ordinary skill in the art upon reading the following detailed description of the presently preferred, but nonetheless illustrative, embodiments when taken in conjunction with the accompanying drawings.

In this respect, before explaining the current embodiments of the hay shaker and livestock feeder in detail, it is to be understood that the hay shaker and livestock feeder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the hay shaker and livestock feeder.

It is therefore important that the claims be regarded as including such equivalent construction insofar as they do not depart from the spirit and scope of the hay shaker and livestock feeder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
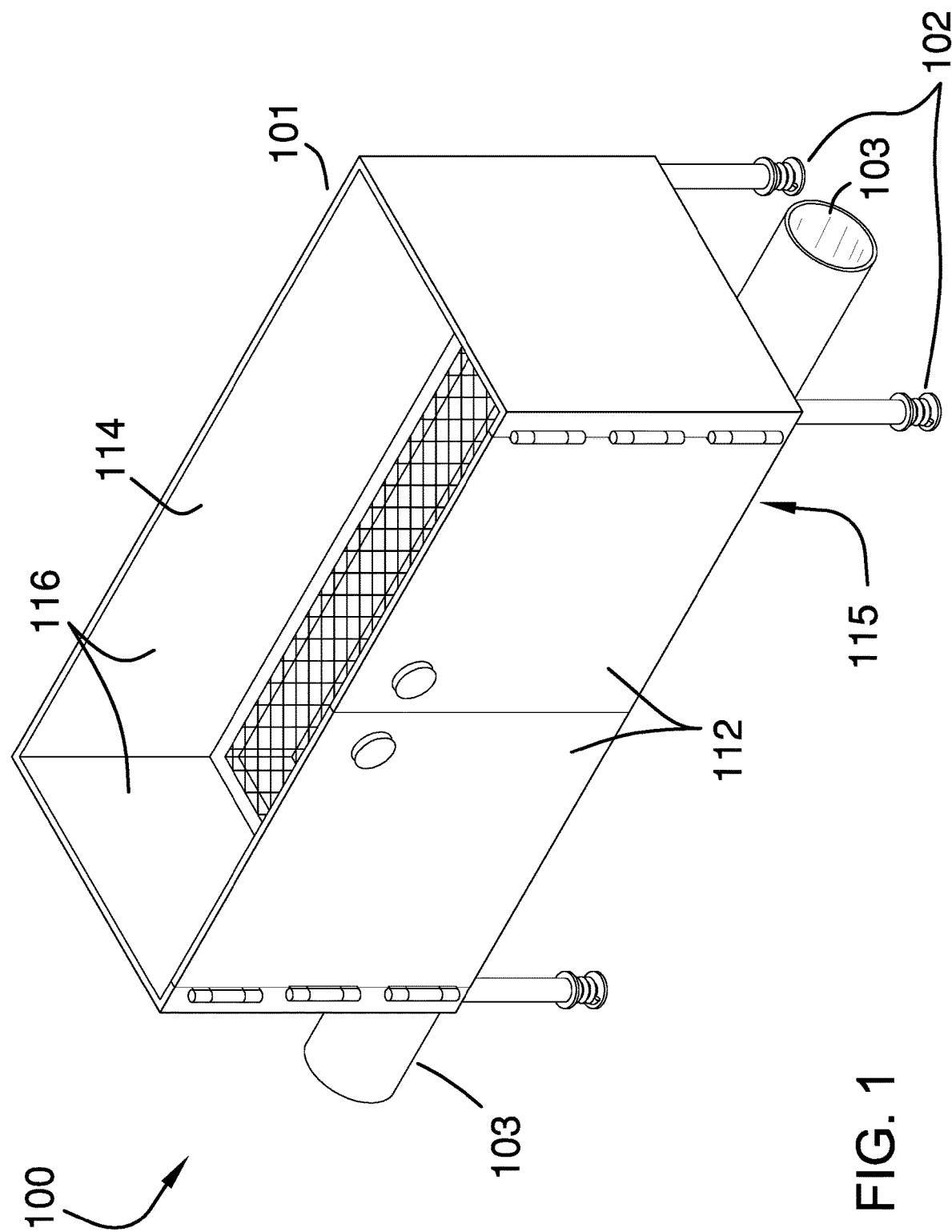
FIG. 1 is a perspective view of an embodiment of the disclosure.
Figure 2:
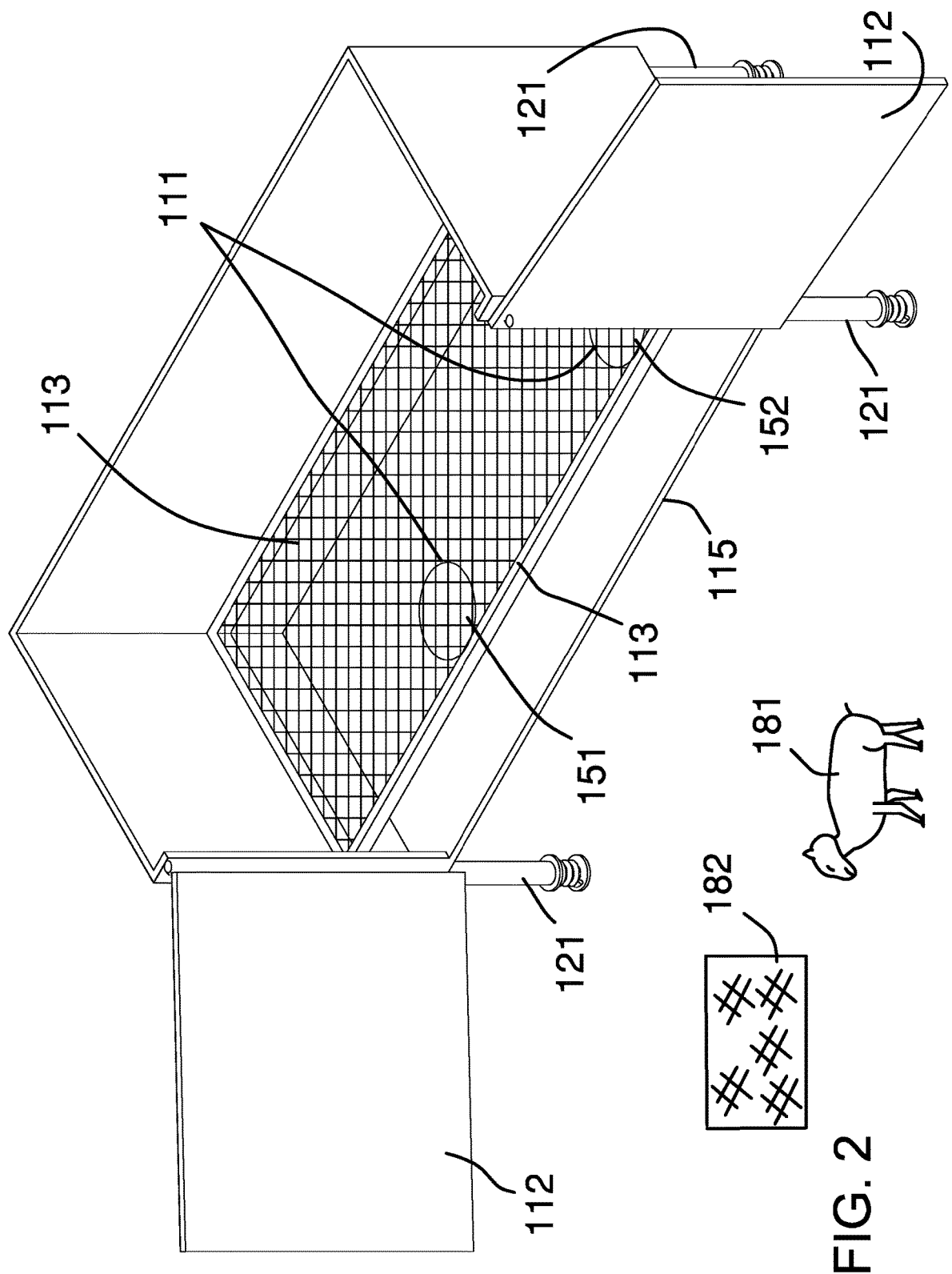
FIG. 2 is a perspective view of an embodiment of the disclosure.
Figure 3:
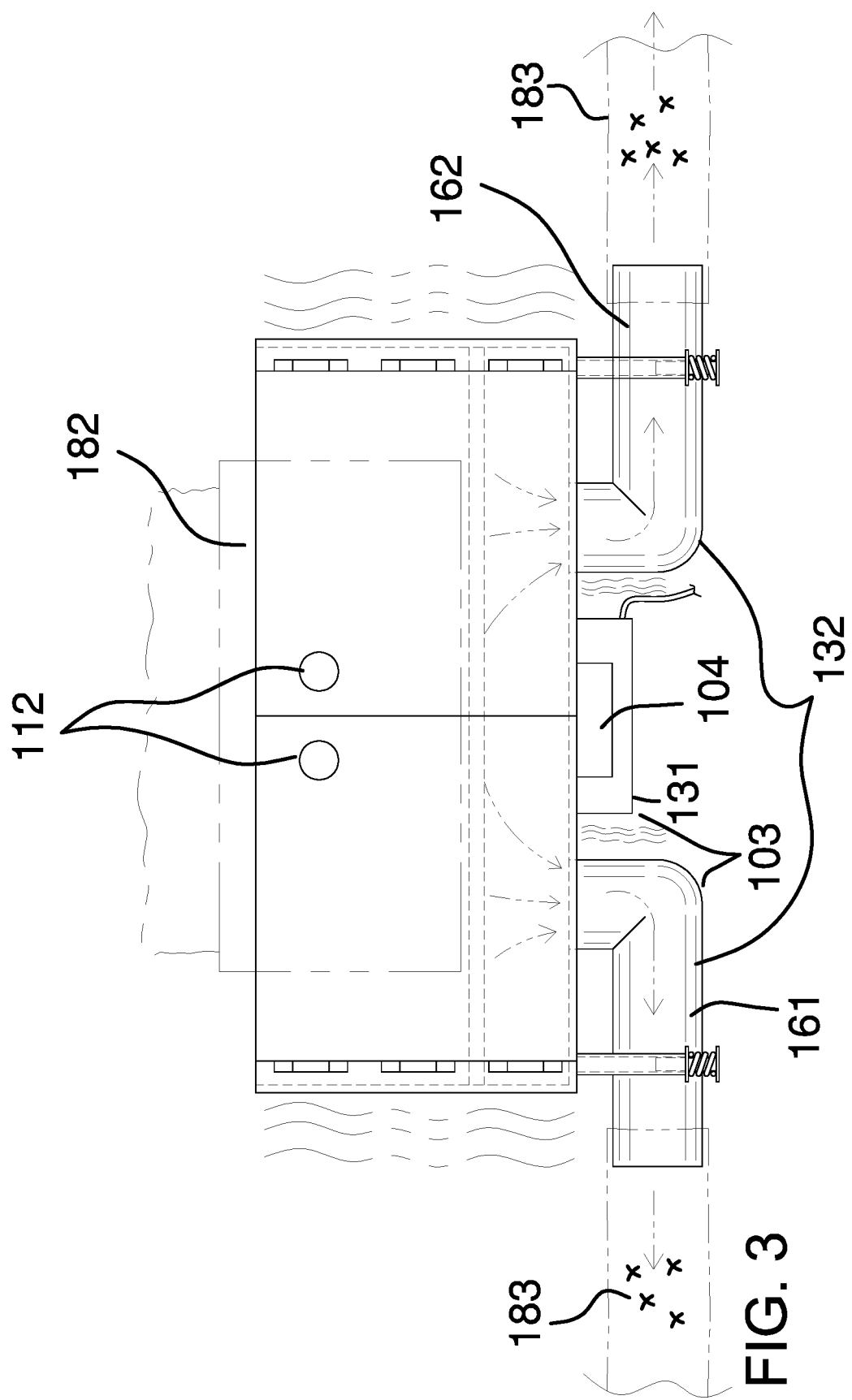
FIG. 3 is a front view of an embodiment of the disclosure.
Figure 5:
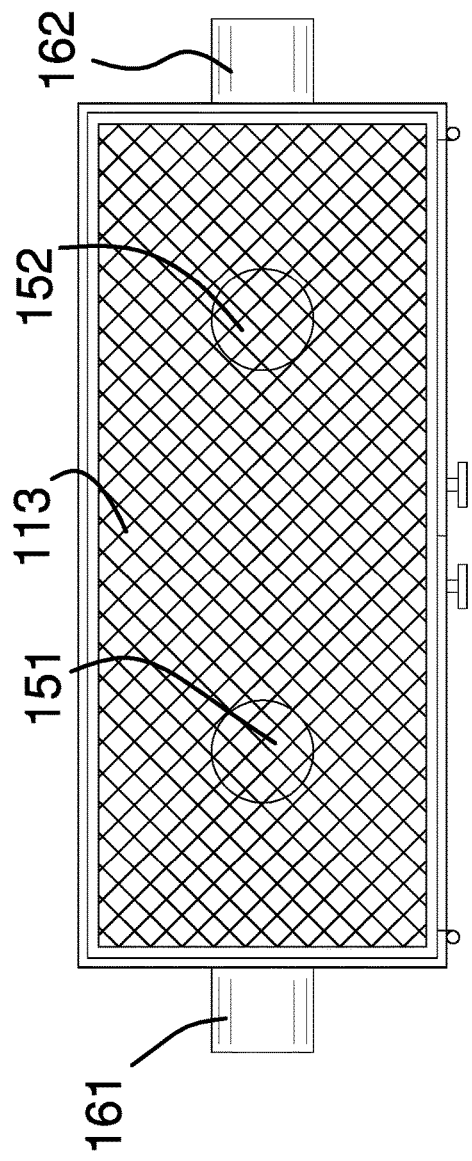
FIG. 5 is a top view of an embodiment of the disclosure.
Figure 6:
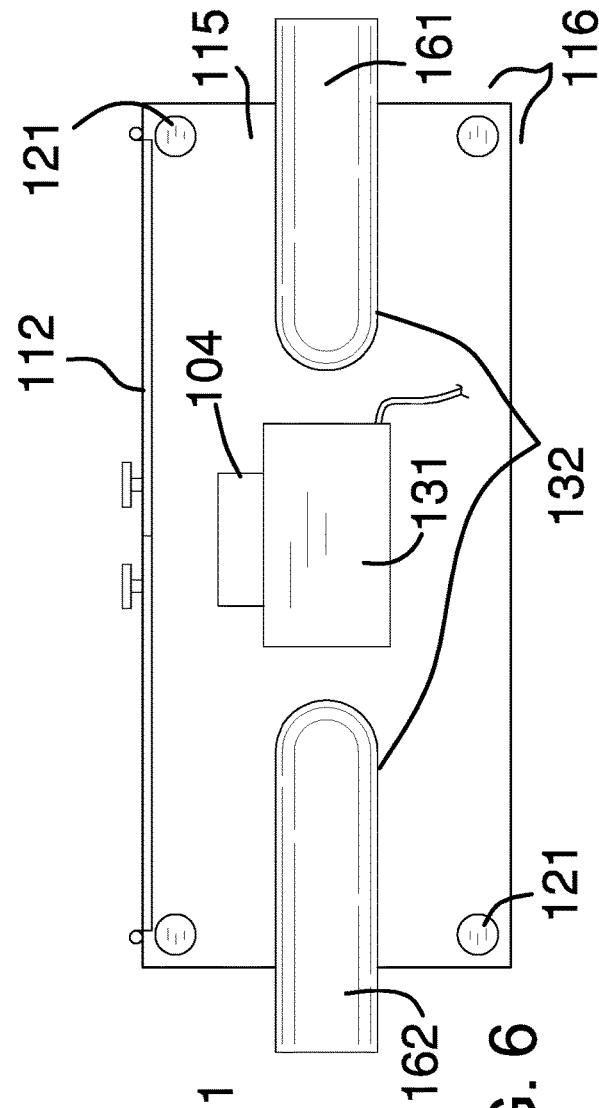
FIG. 6 is a bottom view of an embodiment of the disclosure.
Figure 4:
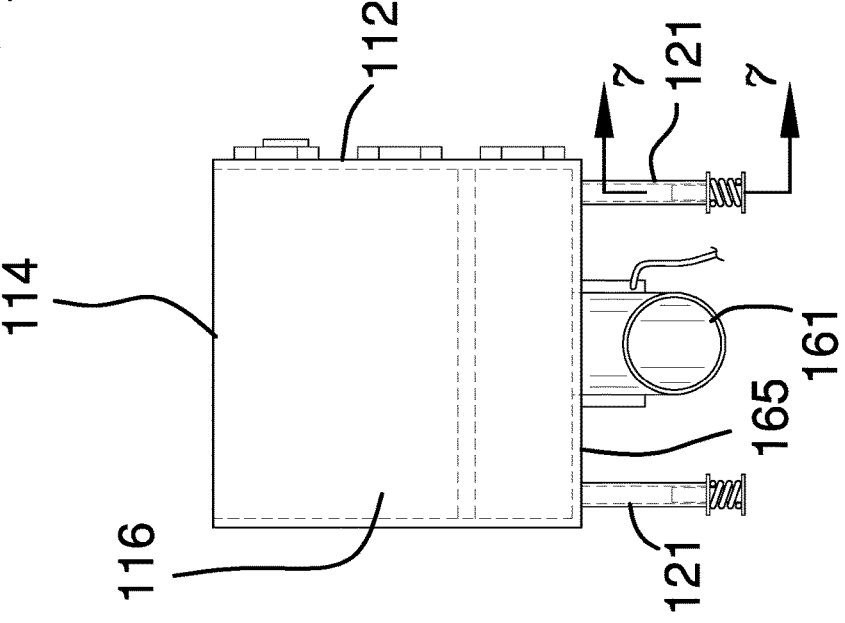
FIG. 4 is a side view of an embodiment of the disclosure.
Figure 7:
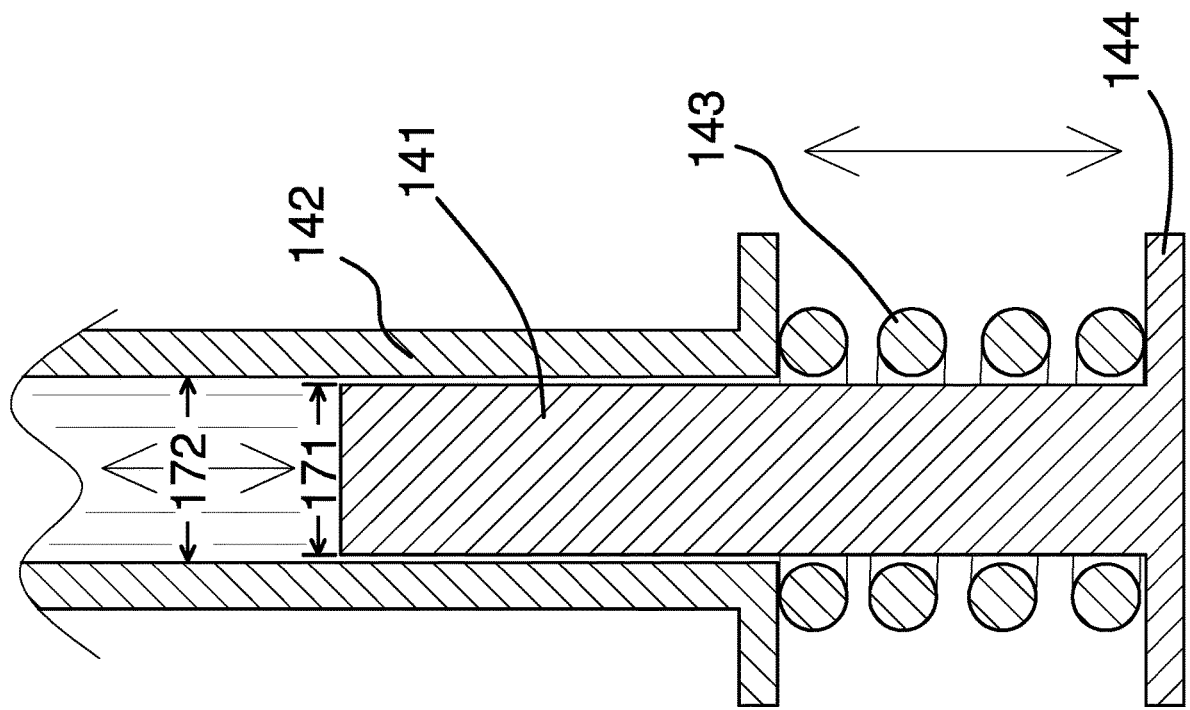
FIG. 7 is a cross-sectional view of an embodiment of the disclosure across 7-7 as shown in FIG. 4.
Figure 8:
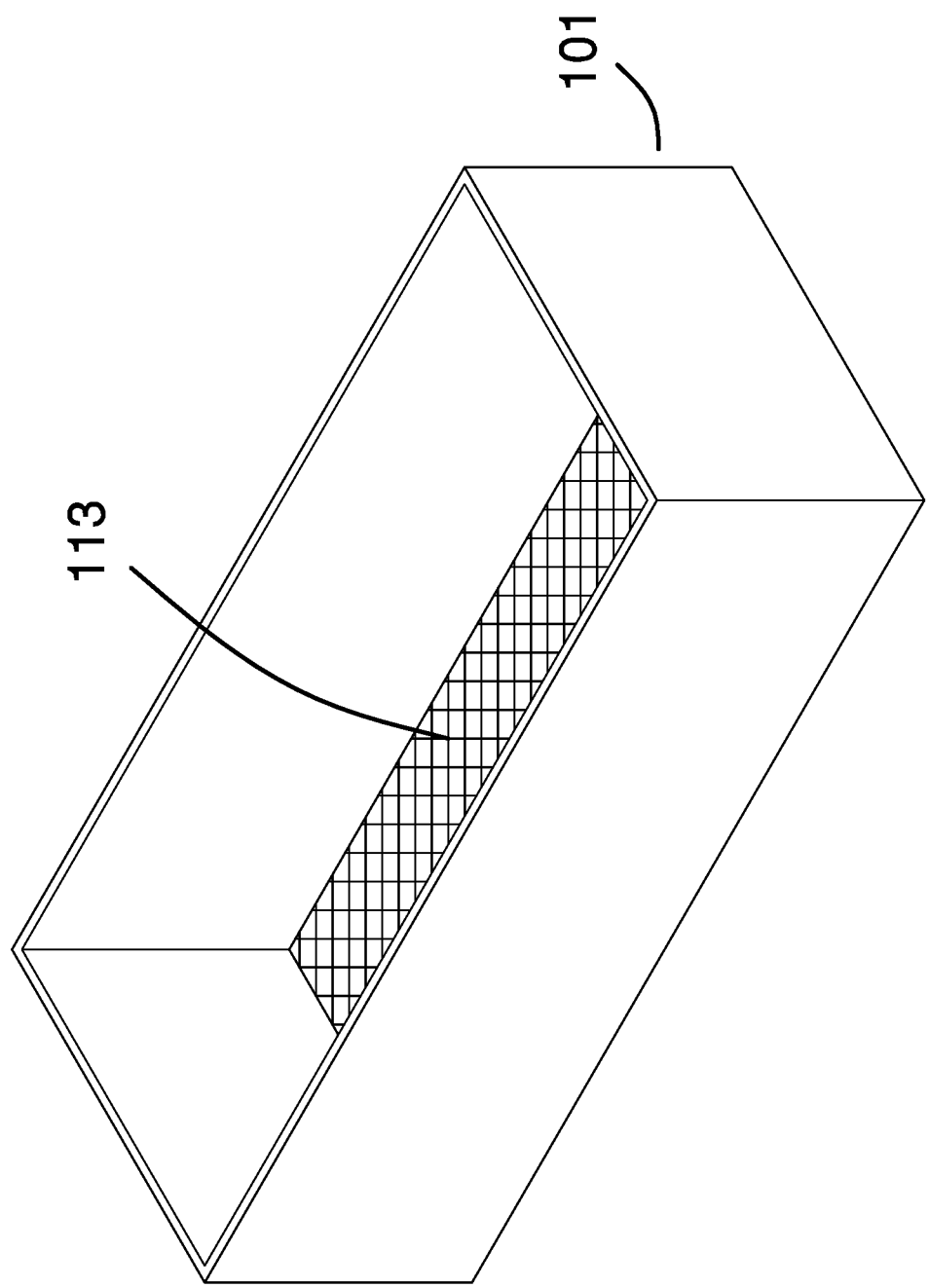
FIG. 8 is a perspective view of an alternate embodiment of the disclosure.

Detailed reference will now be made to one or more potential embodiments of the disclosure, which are illustrated in FIGS. 1 through 8.

The hay shaker and livestock feeder 100 (hereinafter invention) is configured for use with livestock 181. The invention 100 is configured for use with livestock 181 feed 182. The invention 100 removes detritus 183, such as dust, from the livestock 181 feed 182. The invention 100 comprises a separating chamber 101, a plurality of stanchions 102, a vacuum system 103, and one or more vibration motors 104. The plurality of stanchions 102 elevates the separating chamber 101 above the ground. The vacuum system 103 and the one or more vibration motors 104 attach to the separating chamber 101. The separating chamber 101 contains the livestock 181 feed 182. The vacuum system 103 and the one or more vibration motors 104 combine to remove the detritus 183 from the livestock 181 feed 182 contained within the separating chamber 101.

The separating chamber 101 is a containment structure. The separating chamber 101 contains the livestock 181 feed 182 during processing. The separating chamber 101 is a prism-shaped structure. The separating chamber 101 has a pan shape. The separating chamber 101 comprises a plurality of exhaust ports 111, one or more doors 112, and a filter plate 113. The plurality of exhaust ports 111, the one or more doors 112, and the filter plate 113 attach to the pan structure of the separating chamber 101. The separating chamber 101 is further defined with an open face 114, a closed face 115, and a plurality of lateral faces 116.

The open face 114 is the open surface of the pan structure of the separating chamber 101. The open face 114 forms the superior boundary of the separating chamber 101. The livestock 181 feed 182 is introduced into the separating chamber 101 through the open face 114. The open face 114 is a first of the two congruent ends of the prism structure of the separating chamber 101.

The closed face 115 is the face of the separating chamber 101 that is distal from the open face 114. The closed face 115 is geometrically identical to the open face 114. The closed face 115 is a solid structure that forms the second of the two congruent ends of the prism structure of the separating chamber 101. The closed face 115 forms the inferior boundary of the separating chamber 101.

The open face 114 and the closed face 115 are horizontally oriented structures.

The plurality of lateral faces 116 form the vertical containment surfaces of the separating chamber 101. The plurality of lateral faces 116 form the lateral face of the prism structure of the separating chamber 101. The plurality of lateral faces 116 attach the open face 114 to the closed face 115.

Each of the plurality of exhaust ports 111 is an aperture that is formed in the closed face 115 of the pan structure of the separating chamber 101. The plurality of exhaust ports 111 forms a vent through which the detritus 183 from the livestock 181 feed 182 is drawn into the vacuum system 103. The plurality of exhaust ports 111 further comprises a first exhaust port 151 and a second exhaust port 152. The plurality of exhaust ports 111 are formed in the closed face 115.

Each of the one or more doors 112 is a hinged door that is formed a lateral face selected from the plurality of lateral faces 116 of the pan structure of the separating chamber 101. The one or more doors 112 form a rotating structure that offers improved access to the interior space of the separating chamber 101. In the first potential embodiment of the disclosure, the one or more doors 112 comprises a double door arrangement. The double doors provide livestock 181 direct access to the livestock 181 feed 182 while still in the separating chamber 101.

The filter plate 113 is a metal mesh that mounts within the interior space of the separating chamber 101. The livestock 181 feed 182 rests on the filter plate 113 during processing. The filter plate 113 mounts parallel to the closed face 115 of the pan structure of the separating chamber 101. The filter plate 113 forms a mesh that is elevated above the filter plate 113 of the closed face 115 of the pan structure of the separating chamber 101.

The size of the mesh of the filter plate 113 is selected such that the filter plate 113 acts as a surface filter. Specifically, the filter plate 113 is sized such that the livestock 181 feed 182 remains supported on the filter plate 113 during processing while the detritus 183 released by the processing is drawn by the airflow generated by the vacuum system 103 through the filter plate 113 into the plurality of exhaust ports 111.

The plurality of stanchions 102 comprises a collection of individual spring-loaded stanchions 121. Each of the individual spring-loaded stanchion 121 are identical. The individual spring-loaded stanchion 121 is a stanchion that transfers a portion of the load of the separating chamber 101 to the ground. Each of the plurality of stanchions 102 is a supporting structure that forms a load path that transfers a portion of the load of the separating chamber 101 to the ground. The plurality of stanchions 102 elevate the separating chamber 101 above the ground. Each of the plurality of stanchions 102 is a spring-loaded structure that absorbs the vibrations of the separating chamber 101 before these vibrations are transmitted to the ground.

Each individual spring-loaded stanchion 121 comprises an inferior stanchion 141, a superior stanchion 142, a compression spring 143, and a disk 144. The inferior stanchion 141 is further defined with an outer dimension 171. The superior stanchion 142 is further defined with an inner diameter 172.

The inferior stanchion 141 rests on the ground. The superior stanchion 142 attaches to the exterior surface of the closed face 115 of the separating chamber 101.

The inferior stanchion 141 is a hollow first prism that is further defined with an inner dimension 172. The superior stanchion 142 is a second prism that is further defined with an outer dimension 171. The inferior stanchion 141 and the superior stanchion 142 are geometrically similar. The outer dimension 171 of the inferior stanchion 141 is less than the inner dimension 172 of the superior stanchion 142 such that the inferior stanchion 141 inserts into the superior stanchion 142 in a telescopic manner.

The compression spring 143 is a helical coil spring. The inferior stanchion 141 is sized to slide into the compression spring 143. The compression spring 143 is sized to support the superior stanchion 142 above the ground. Specifically, as shown most clearly in FIG. 7, the superior stanchion 142 rests on the compression spring 143 such that any vibrations transmitted from the separating chamber 101 to the superior stanchion 142 are absorbed by the compression spring 143. The disk 144 is a disk-shaped structure that attaches to the end of the inferior stanchion 141 that is distal from the separating chamber 101. The disk 144 forms a pedestal between the inferior stanchion 141 and the ground.

The detritus 183 removed from the livestock 181 feed 182 by the one or more vibration motors 104 is removed from the separating chamber 101 by the vacuum system 103. The vacuum system 103 generates a vacuum within the separating chamber 101 such that the vacuum system 103 creates an air flow the pulls any airborne detritus 183 out of the separating chamber 101. The vacuum system 103 comprises a vacuum pump 131 and a plurality of exhaust pipes 132.

The vacuum pump 131 is an air pump. The vacuum pump 131 creates a reduced pressure in the plurality of exhaust pipes 132 such that air is drawn into the plurality of exhaust pipes 132 from the interior space of the separating chamber 101. The vacuum pump 131 provides the motive forces that draw the detritus 183 away from the livestock 181 feed 182.

Each of the plurality of exhaust pipes 132 is a pipe that attaches to an exhaust port selected from the plurality of exhaust ports 111. Each of the plurality of exhaust pipes 132 transports the detritus 183 released from the livestock 181 feed 182 away from the interior space of the separating chamber 101. The plurality of exhaust pipes 132 comprises a first exhaust pipe 161 and a second exhaust pipe 162. The first exhaust pipe 161 is the transport pipe selected from the plurality of exhaust pipes 132 that attaches to first exhaust port 151 selected from the plurality of exhaust ports 111. The second exhaust pipe 162 is the transport pipe selected from the plurality of exhaust pipes 132 that attaches to second exhaust port 152 selected from the plurality of exhaust ports 111.

Each of the one or more vibration motors 104 is a commercially available vibration motor. Each of the one or more vibration motors 104 are mounted on the separating chamber 101. Each of the one or more vibration motors 104 vibrates the separating chamber 101 while the livestock 181 feed 182 is stored within the separating chamber 101. The vibration of the separating chamber 101 by the one or more vibration motors 104 releases the detritus 183 from the livestock 181 feed 182.

This paragraph describes the theory of operation of the invention 100. The one or more vibration motors 104 vibrates the separating chamber 101 such that the vibration of the separating chamber 101 vibrates the livestock 181 feed 182 that is resting on the filter plate 113. The vibration of the livestock 181 feed 182 releases the detritus 183 trapped in the livestock 181 feed 182 into the air surrounding the livestock 181 feed 182. The vacuum system 103 creates an airflow through the separating chamber 101 that draws the detritus 183 through the filter plate 113 and the plurality of exhaust ports 111 into the vacuum system 103 for subsequent discharge.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chamber: As used in this disclosure, a chamber is an enclosed or enclosable negative space that is dedicated to a purpose.

Compression Spring: As used in this disclosure, a compression spring is a wire coil that resists forces attempting to compress the wire coil in the direction of the center axis of the wire coil. The compression spring will return to its original position when the compressive force is removed.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Detritus: As used in this disclosure, detritus refers to an accumulation of unwanted material on a surface.

Disk: As used in this disclosure, a disk is a prism-shaped object that is flat in appearance. Specifically, the sum of the surface areas of two ends of the prism-shaped object that forms the disk is greater than the surface area of the lateral face of the prism-shaped object that forms the disk. In this disclosure, the ends of the prism-shaped structure that forms the disk are referred to as the faces of the disk.

Door: As used in this disclosure, a door is a movable or removable barrier that is attached to the wall of a room or the surface of a container for the purpose of allowing or preventing access through an aperture into the room or container. A double door refers to an arrangement where two independent rotatable barriers are used to control access through the aperture. A double door is often referred to as a French door.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically cause the rotor to rotate within the stator thereby generating rotational mechanical energy. This disclosure assumes that the power source is an externally provided source of DC electrical power. The use of DC power is not critical and AC power can be used by exchanging the DC electric motor with an AC motor that has a reversible starter winding.

Elevation: As used in this disclosure, elevation refers to the span of the distance in the superior direction between a specified horizontal surface and a reference horizontal surface. Unless the context of the disclosure suggests otherwise, the specified horizontal surface is the supporting surface the potential embodiment of the disclosure rests on. The infinitive form of elevation is to elevate.

Filter: As used in this disclosure, a filter is a mechanical device that is used to separate solids that are suspended in a liquid or a gas. A strainer is type of filter with what would be considered a coarse mesh measurement.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Ground: As used in this disclosure, the ground is a solid supporting surface formed by the Earth. The term level ground means that the supporting surface formed by the ground is roughly perpendicular to the force of gravity. Always use supporting surface.

Helical Spring: As used in this disclosure, a helical spring is a compression spring shaped in the form of a cylindrical helix.

Helix: As used in this disclosure, a helix is a three-dimensional structure that would be formed by a wire that is wound uniformly around the surface of a cylinder or a cone.

If the wire is wrapped around a cylinder, the helix is called a cylindrical helix. If the wire is wrapped around a cone, the helix is called a conical helix. A synonym for conical helix would be a volute.

Hinge: As used in this disclosure, a hinge is a device that permits the turning, rotating, or pivoting of a first object relative to a second object.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inner Dimension: As used in this disclosure, the term inner dimension describes the span from a first inside or interior surface of a container to a second inside or interior surface of a container. The term is used in much the same way that a plumber would refer to the inner diameter of a pipe.

Livestock: As used in this disclosure, livestock refers to one or more animals that are maintained as the property of an agricultural operation.

Mesh: As used in this disclosure, the term mesh refers to an openwork fabric made from threads, yarns, cords, wires, or lines that are woven, knotted, or otherwise twisted or intertwined at regular intervals. Synonyms for mesh include net.

Motor: As used in this disclosure, a motor refers to the method of transferring energy from an external power source into rotational mechanical energy.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Pan: As used in this disclosure, a pan is a hollow and prism-shaped containment structure. The pan has a single open face. The open face of the pan is often, but not always, the superior face of the pan. The open face is a surface selected from the group consisting of: a) an end of the prism structure that forms the pan; and, b) a lateral face of the prism structure that forms the pan.

Pedestal: As used in this disclosure, a pedestal is an intermediary load bearing structure that that transfers a load path between a supporting surface and an object, structure, or load.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline, they are said to be aligned. In this disclosure, the terms inner dimension of a pipe and outer dimension are used as they would be used by those skilled in the plumbing arts.

Port: As used in this disclosure, a port is an opening formed in an object that allows fluid to flow through the boundary of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Stanchion: As used in this disclosure, a stanchion refers to a vertical pole, post, or support. See beam and gusset and strut.

Supporting Surface: As used in this disclosure, a supporting surface is a horizontal surface upon which an object is placed and to which the load path of the object is transferred. This disclosure assumes that an object placed on the supporting surface is in an orientation that is appropriate for the normal or anticipated use of the object.

Surface Filter: As used in this disclosure, a surface filter is a type of filter wherein the fluid is passed through a surface or membrane, such as a screen or paper that allows for the passage of the fluid but blocks the passage of larger particles that may be suspended in the fluid. The construction of a surface filter would allow for the passage of the fluid through several filter surfaces in one filtration unit.

Telescopic: As used in this disclosure, telescopic is an adjective that describes an object made of sections that fit or slide into each other such that the object can be made longer or shorter by adjusting the relative positions of the sections.

Vacuum: As used in this disclosure, vacuum is used to describe a first space that contains gas at a reduced gas pressure relative to the gas pressure of a second space. If the first space and the second space are connected together, this pressure differential will cause gas from the second space to move towards the first space until the pressure differential is eliminated.

Vent: As used in this disclosure, a vent is an opening in a structure that allows for the flow of gas through the boundary of the structure.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vibration Motor: As used in this disclosure, a vibration motor is an electric motor that rotates an unbalanced weight in such a manner that the electric motor vibrates during operation. The vibration can be varied by varying the rotational speed of the vibration motor. The rotational speed is varied by varying the With respect to the above description, it is to be realized that the optimum dimensional relationship for the various components of the invention described above and in FIGS. 1 through 8 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A livestock feeding device:
   a separating chamber, a plurality of stanchions, a vacuum system, and one or more vibration motors;
   wherein the plurality of stanchions elevates the separating chamber above the ground;
   wherein the vacuum system and the one or more vibration motors attach to the separating chamber;
   wherein the livestock feeding device is configured for use with livestock;
   wherein the livestock feeding device is configured for use with livestock feed;
   wherein the livestock feeding device removes detritus from the livestock feed;
   wherein the separating chamber is a containment structure;
   wherein the vacuum system and the one or more vibration motors combine to remove the detritus from the livestock feed contained within the separating chamber.

2. The livestock feeding device according to claim 1
   wherein the separating chamber contains the livestock feed during processing;
   wherein the separating chamber is a prism-shaped structure;
   wherein the separating chamber has a pan shape.

3. The livestock feeding device according to claim 2
   wherein the plurality of stanchions comprises a collection of individual spring-loaded stanchions;
   wherein each individual spring-loaded stanchion is identical;
   wherein the individual spring-loaded stanchion transfers a portion of the load of the separating chamber to the ground.

4. The livestock feeding device according to claim 3 wherein each of the plurality of stanchions is a supporting structure that elevates the separating chamber above the ground.

5. The livestock feeding device according to claim 4 wherein each of the plurality of stanchions is a spring-loaded structure that absorbs the vibrations of the separating chamber.

6. The livestock feeding device according to claim 5
   wherein the detritus removed from the livestock feed by the one or more vibration motors is removed from the separating chamber by the vacuum system;
   wherein the vacuum system generates a vacuum within the separating chamber such that the vacuum system creates an air flow the pulls any airborne detritus out of the separating chamber.

7. The livestock feeding device according to claim 1
   wherein the vacuum system comprises a vacuum pump and a plurality of exhaust pipes;
   wherein the vacuum pump is an air pump;
   wherein the vacuum pump creates a reduced pressure in the plurality of exhaust pipes such that air is drawn into the plurality of exhaust pipes from the interior space of the separating chamber;
   wherein the vacuum pump provides the motive forces that draw the detritus away from the livestock feed;
   wherein each of the plurality of exhaust pipes is a pipe that attaches to an exhaust port selected from the plurality of exhaust ports;
   wherein each of the plurality of exhaust pipes transports the detritus released from the livestock feed away from the interior space of the separating chamber.

8. The livestock feeding device according to claim 7
   wherein each of the one or more vibration motors are mounted on the separating chamber;
   wherein each of the one or more vibration motors vibrates the separating chamber;
   wherein the vibration of the separating chamber by the one or more vibration motors releases the detritus from the livestock feed.

9. The livestock feeding device according to claim 8
   wherein the separating chamber further comprises a plurality of exhaust ports, one or more doors, and a filter plate;
   wherein the plurality of exhaust ports, the one or more doors, and the filter plate attach to the pan structure of the separating chamber;
   wherein the separating chamber is further defined with an open face, a closed face, and a plurality of lateral faces;
   wherein the livestock feed is introduced into the separating chamber through the open face;
   wherein the open face is a first of the two congruent ends of the prism structure of the separating chamber;
   wherein the closed face is a solid structure that forms the second of the two congruent ends of the prism structure of the separating chamber;
   wherein the closed face is the face of the separating chamber that is distal from the open face;
   wherein the closed face is geometrically identical to the open face;
   wherein the open face and the closed face are horizontally oriented structures;
   wherein the plurality of lateral faces form the vertical containment surfaces of the separating chamber;

wherein the plurality of lateral faces form the lateral face of the prism structure of the separating chamber;

wherein the plurality of lateral faces attach the open face to the closed face.

10. The livestock feeding device according to claim 9 wherein each individual spring-loaded stanchion comprises an inferior stanchion, a superior stanchion, a compression spring, and a disk;

wherein the inferior stanchion is further defined with an outer dimension;

wherein the superior stanchion is further defined with an inner diameter;

wherein the inferior stanchion rests on the ground;

wherein the superior stanchion attaches to the exterior surface of the closed face of the separating chamber.

11. The livestock feeding device according to claim 10 wherein each of the plurality of exhaust ports is an aperture that is formed in the closed face of the pan structure of the separating chamber.

12. The livestock feeding device according to claim 11 wherein each of the one or more doors is a hinged door that is formed a lateral face selected from the plurality of lateral faces of the pan structure of the separating chamber;

wherein the one or more doors form a rotating structure that offers access to the interior space of the separating chamber.

13. The livestock feeding device according to claim 12 wherein the filter plate is a metal mesh that mounts within the interior space of the separating chamber;

wherein the livestock feed rests on the filter plate.

14. The livestock feeding device according to claim 13 wherein the filter plate mounts parallel to the closed face of the pan structure of the separating chamber;

wherein the filter plate forms a mesh that is elevated above the filter plate of the closed face of the pan structure of the separating chamber.

15. The livestock feeding device according to claim 14 wherein the filter plate is sized such that the livestock feed remains supported on the filter plate during processing while the detritus is drawn by an airflow generated by the vacuum system through the filter plate into the plurality of exhaust ports.

16. The livestock feeding device according to claim 15 wherein the inferior stanchion is a hollow first prism;

wherein the superior stanchion is a second prism;

wherein the inferior stanchion and the superior stanchion are geometrically similar;

wherein the outer dimension of the inferior stanchion is less than the inner dimension of the superior stanchion such that the inferior stanchion inserts into the superior stanchion in a telescopic manner.

17. The livestock feeding device according to claim 16 wherein the compression spring is a helical coil spring;

wherein the inferior stanchion is sized to slide into the compression spring;

wherein the compression spring is sized to support the superior stanchion above the ground;

wherein the disk is a disk-shaped structure that attaches to the end of the inferior stanchion that is distal from the separating chamber;

wherein the disk forms a pedestal between the inferior stanchion and the ground.

18. The livestock feeding device according to claim 17 wherein the plurality of exhaust ports further comprises a first exhaust port and a second exhaust port;

wherein the plurality of exhaust pipes comprises a first exhaust pipe and a second exhaust pipe;

wherein the first exhaust pipe is the transport pipe selected from the plurality of exhaust pipes that attaches to first exhaust port selected from the plurality of exhaust ports;

wherein the second exhaust pipe is the transport pipe selected from the plurality of exhaust pipes that attaches to second exhaust port selected from the plurality of exhaust ports.

19. The livestock feeding device according to claim 18 wherein the one or more doors comprises a double door arrangement.

\* \* \* \* \*